Nov. 26, 1935.  W. C. HEDGCOCK  2,021,916
BRAKE ARRANGEMENT
Filed July 27, 1931   2 Sheets-Sheet 2
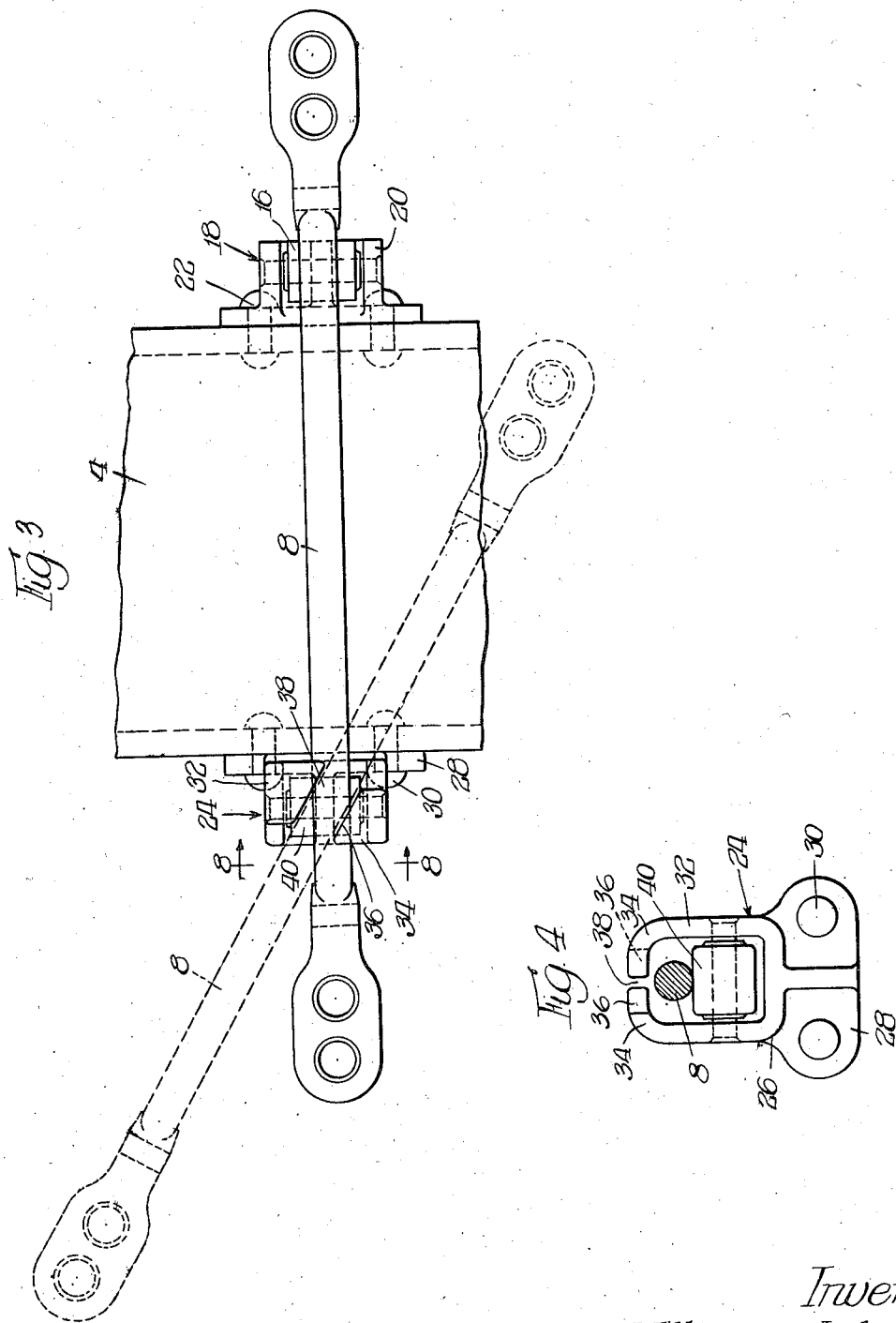
Inventor:
William C. Hedgcock,
By Wilkinson, Huxley, Byron + Knight
attys.

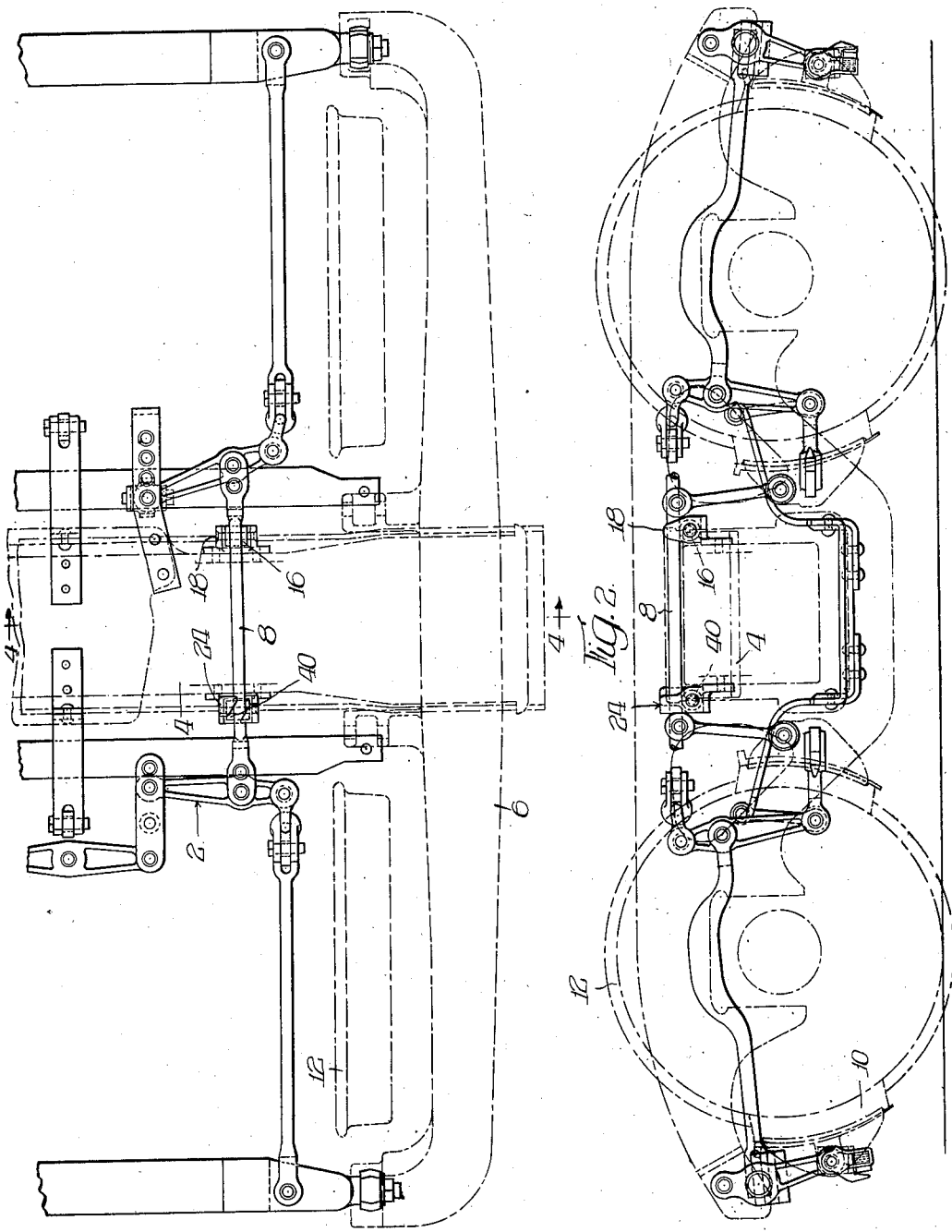

Patented Nov. 26, 1935

2,021,916

UNITED STATES PATENT OFFICE 2,021,916

BRAKE ARRANGEMENT

William C. Hedgcock, Wilmette, Ill., assignor to American Steel Foundries, Chicago, Ill., a corporation of New Jersey Application July 27, 1931, Serial No. 553,335

11 Claims. (Cl. 188—205)

The present invention relates to brake mechanisms or arrangements, and more in particular to novel means for support of a brake rod thereof and for taking up slack therein.

Among the objects of the present invention is to provide novel means in a brake mechanism for support of a brake rod thereof and to prevent its displacement during operation thereof or the car to which it is attached.

In certain types of railway cars, as for example, open top freight cars wherein the contents are unloaded by overturning the car while clamped in a roll-over dumper, the brake rods of the present brake mechanisms tend to fall out of the open top supports therefor. Under these conditions, these rods, unless returned to their normal operative position upon their supports, cause the brake mechanism to become partially or totally inoperative.

It is therefore an object of the present invention to provide novel means for supporting and retaining a brake rod in operative position, whereby the same operates in association with the remaining brake mechanism to effectively transmit braking movements to the brake shoes, such means including structure adapted to retain the rod when the same is in a plane other than in the plane of operation thereof and to effectively restore the same upon such supporting means after the same has been moved into its operative position.

In an illustrative embodiment of the invention, such supporting means comprising a bracket provided with upstanding walls preventing lateral displacement of the rod, these walls having inturned flanges terminating in spaced relation to provide a slot or opening diagonally disposed relative to the axis of the bracket and rod in operative position. The rod is adapted to be received in the slot or opening and moved into its operative position, at which time the flanges of the support overhang the rod to prevent upward displacement thereof. In the embodiment selected to illustrate the invention, this type of bracket is shown in combination with an open top bracket for support of the brake rod, although it is understood any other bracket of suitable construction may be used in combination therewith.

With these and various other objects in view, the invention may consist of certain novel features of construction and operation, as will be more fully described and particularly pointed out in the specification, drawings and claims appended hereto.

In the drawings, which illustrate an embodiment of the device and wherein like reference characters are used to designate like parts—

Figure 1 is a fragmentary diagrammatic top plan view of a truck assembly disclosing a brake mechanism including embodiments of the present invention associated therewith;

Figure 2 is a view in side elevation of the car truck assembly of Figure 1 of the drawings and the brake mechanism of the present invention;

Figure 3 is a fragmentary top plan view of a bolster of the truck assembly and disclosing the brake rod supporting means of the present invention connected thereto;

Figure 4 is an end view of the brake rod supporting means and is taken in a plane represented by line 8—8 of Figure 3 of the drawings.

Referring now more in detail to the drawings, an embodiment of the present invention is shown in connection with brake mechanism, generally referred to as 2, associated with a transverse bolster 4 spanning between side frames 6 of a car truck assembly diagrammatically shown in dotted lines in the drawings, this brake mechanism being provided with a brake rod 8, operatively moved through various brake levers by a brake cylinder (not disclosed) for causing the brake shoes 10 to move into contacting relation with the tread of the car wheels 12.

The present invention relates more in particular to novel supporting means for the brake rod 8.

One end of the brake rod 8 is supported upon a roller 16 of a bracket 18 having upstanding walls 20 open at their top ends, this bracket being secured to the transverse bolster 4 by any suitable means, such as the rivets 22. At the present time, both ends of the brake rod 8 are supported by means of brackets similar to the bracket 18 and having an open top, whereby the rod may be inserted therein and operatively carried by rollers, such as the roller 16. These brackets or carriers prevent lateral displacement of the brake rod, but under certain conditions, vertical displacement may take place which causes the rods to become disengaged therefrom.

The invention therefore contemplates the idea of providing a brake rod support or carrier adapted to prevent vertical displacement of the brake rod and to maintain the same in its operative position. Such means in the present invention is disclosed as comprising a bracket or carrier 24 having a body portion 26 provided with downwardly extending flanges 28 for securing the bracket to the bolster 4, as by means of rivets 30, or the like. This bracket is provided with upstanding wall portions 32 having upper inturned flanges 34, the inner surface 36 of each of these inturned flanges being angularly disposed relative to the axis of the bracket and in spaced relation to provide a diagonal slot or opening 38 for receiving the brake rod 8. As clearly shown in dotted lines in Figure 3 of the drawings, the brake rod 8 may be inserted through this diagonal opening 38 and into supporting relation with a roller 40 mounted in the wall portions 32 of the bracket. After the rod has been inserted through the opening 38, the same may be easily swung into its operative position, as clearly shown in full lines in Figure 3 of the drawings, whereby the same is supported by the bracket 24 and the bracket 18.

It will be quite apparent from the drawings, that the inturned flanges 34 overhang the brake rod 8 to prevent upward displacement thereof under all conditions and maintains the same in its operative position. The brake rod 8 may be removed from the bracket 24 by merely disconnecting the ends of the same from their associated brake levers and rotating the same into a position, as shown in Figure 3 of the drawings, at which time the same may be removed through the diagonal slot or opening 38.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a car brake mechanism having a brake rod, means for supporting said rod, said means comprising a bracket having upstanding wall portions, and a second bracket having upstanding wall portions provided with inturned flanges preventing vertical displacement of said rod.

2. In a car brake mechanism having a brake rod, means for supporting said rod, said means comprising a bracket having upstanding wall portions providing an opening therebetween, and a second bracket having upstanding wall portions provided with inturned flanges spaced apart to provide an opening angularly disposed relative to the plane of said brackets, whereby said rod may be received therein and turned into supporting relation with said brackets and to prevent vertical displacement thereof.

3. In a car brake mechanism having a brake rod, means for supporting said rod, said means comprising an open U-shaped bracket, and a second U-shaped bracket having inturned flanges spaced apart to provide an opening diagonally disposed relative to the plane of said brackets for reception of said rod, said second bracket preventing vertical displacement of said rod from said brackets when supported in operative position thereon.

4. In a car brake mechanism having a brake rod, means for supporting said rod, said means comprising spaced brackets, one of said brackets having means for holding said rod against lateral displacement, and the other of said brackets having means for holding said rod against lateral and vertical displacement, said brackets having means for anti-frictionally mounting said rod for longitudinal movement.

5. The combination of a rod, and means for supporting said rod, said means comprising spaced brackets, one of said brackets having means for holding said rod against lateral displacement, and the other of said brackets having means for holding said rod against lateral and vertical displacement, said brackets having means for anti-frictionally mounting said rod for longitudinal movement.

6. The combination of a rod, and means for supporting said rod, said means comprising spaced brackets, one of said brackets having means for holding said rod against lateral displacement, and the other of said brackets having means for holding said rod against lateral and vertical displacement when said rod is in its normal operative position, said second-named bracket having an opening whereby said rod may be moved into and out of its normal operative position when displaced angularly in relation to said position.

7. The combination of a rod, and means for supporting said rod, said means comprising spaced brackets, one of said brackets having means for holding said rod against lateral displacement, and the other of said brackets having means for holding said rod against lateral and vertical displacement when said rod is in its normal operative position, said second-named bracket having an opening whereby said rod may be moved into and out of its normal operative position when displaced angularly in relation to said position, said brackets having means for anti-frictionally mounting said rod for longitudinal movement.

8. The combination of a rod, and means for supporting said rod, said means comprising spaced brackets, one of said brackets having means for holding said rod against lateral displacement, and the other of said brackets having means for holding said rod against lateral and vertical displacement when said rod is in its normal operative position, said second-named bracket having an opening whereby said rod may be moved into and out of its normal operative position when displaced angularly in relation to said position, and rollers mounted in said brackets for supporting said rod.

9. The combination of a rod, and means for supporting said rod, said means comprising spaced brackets, one of said brackets having spaced walls to hold said rod against lateral displacement, and the other of said brackets having spaced walls with overhanging flanges defining an opening, said walls and flanges of said last-named bracket holding said rod against lateral and vertical displacement when in normal operative position, said opening being provided whereby said rod can be moved into and out of its normal operative position when displaced angularly in relation to said position.

10. The combination of a rod, and means for supporting said rod, said means comprising spaced brackets, one of said brackets having spaced walls to hold said rod against lateral displacement, and the other of said brackets having spaced walls with overhanging flanges defining an opening, said walls and flanges of said last-named bracket holding said rod against lateral and vertical displacement when in normal operative position, said opening being provided whereby said rod can be moved into and out of its normal operative position when displaced angularly in relation to said position, said brackets having means for anti-frictionally mounting said rod for longitudinal movement.

11. The combination of a rod, and means for supporting said rod, said means comprising spaced brackets, one of said brackets having spaced walls to hold said rod against lateral displacement, and the other of said brackets having spaced walls with overhanging flanges defining an opening, said walls and flanges of said last-named bracket holding said rod against lateral and vertical displacement when in normal operative position, said opening being provided whereby said rod can be moved into and out of its normal operative position when displaced angularly in relation to said position, said brackets having rollers mounted in said walls for supporting said rod.

WILLIAM C. HEDGCOCK.